United States Patent [19]

Derenski et al.

[11] 3,800,069

[45] Mar. 26, 1974

[54] SINGLE STEP TAPE READER

[75] Inventors: David J. Derenski, Chicago; Kenneth W. Wiater, Bensenville, both of Ill.

[73] Assignee: Teletype Corporation, Skokie, Ill.

[22] Filed: Nov. 6, 1972

[21] Appl. No.: 304,174

[52] U.S. Cl. .................... 178/4.1, 178/17 R, 178/79

[51] Int. Cl. .................... H041 23/00

[58] Field of Search ......... 178/79, 17 B, 17 A, 17.5, 178/4.1, 17 R

[56] References Cited

UNITED STATES PATENTS

| | | | |
|---|---|---|---|
| 3,317,660 | 5/1967 | Simms | 178/95 |
| 2,463,696 | 3/1949 | Keyes | 178/17 B |

*Primary Examiner*—Kathleen H. Claffy
*Assistant Examiner*—Gerald Brigance
*Attorney, Agent, or Firm*—Sherman P. Appel; John L. Landis

[57] ABSTRACT

A telegraph transmitter is adapted to generate a stream of output signals while operating in a continuous or running mode as an encoded punched tape incrementally is driven past a sensing station by an intermittently operated tape advancing means in response to a spontaneously reciprocated electromagnetic armature. The transmitter has a single character or discontinuous mode requiring manipulation of a manual member for moving the tape through the agency of the advancing means for each character to be sensed. Repeat of the single character mode can be attained only by intention.

11 Claims, 7 Drawing Figures

SINGLE STEP TAPE READER

FIELD OF THE INVENTION

This invention relates to a telegraph transmitter which senses input intelligence carried on a perforated recording medium for printing. Paricularly it relates to a telegraph transmitter having a punched tape reader wherein an electromagnet supplies the entire force for sensing tape apertures and advancing the tape. Specifically, the invention relates to a telegraph transmitter of the class exemplified in U.S. Pat. Re. No. 26,008, reissued April 26, 1966, for an invention of L. C. Anderson, Jr., et al. and assigned to the assignee of the present application.

A telegraph transmitter of the referenced class is adapted to "read" a tape punched with a code whose characters extend transversely of the direction of tape movement. An electromagnet supplies the power for operating (1) code sensing elements which are projected through and withdrawn from the encoded holes and (2) the tape advancing means to align the encoded symbols at a sensing station. Conventionally, the transmitter is operable in a continuous or running mode in which a punched tape is spontaneously advanced in increments for moving successive characters to a sensing station at which the tape is halted while each character is read.

From a continuous mode, the transmitter can be stopped by intention through the agency of a manual member, and may be stopped spontaneously in the event the tape runs out or when the tape becomes taut. In each of the stopped conditions the circuit to the electromagnet is opened and prevents further transmitter operation. However, the advancing means is then disposed at an aspect for engaging tape and preventing its movement, if present, through the transmitter.

The transmitter also has a "free wheeling" mode in which the circuit to the electromagnet is broken and the sensing means is disabled. Unlike the other modes in which the transmitter is stopped, in the free wheeling mode, the tape advancing means is disposed at an aspect enabling tape movement, manually. It is only while a transmitter is in a free wheeling mode that a tape can be edited; and then only as the result of physically moving the tape by hand. This editing limitation is considered a shortcoming of heretofore known transmitters, as the transmitter is wholly disabled and the editing process is slow.

SUMMARY OF THE INVENTION

It is an object of the present invention to overcome the foregoing shortcoming by providing a telegraph transmitter adapted to operate in a discontinuous or character-at-a-time mode.

It is a further object of the invention to operate a telegraph transmitter of the indicated class for reading only a single character and then only in response to a manual act.

The foregoing, and other objects of the invention which will become apparent from the ensuing detailed description of the invention, are attained in a telegraph transmitter having a running mode, during which a tape is spontaneously advanced in successive increments for transporting a succession of encoded characters past a sensing station to produce a stream of outputs in response to continuous reciprocation of the armature of an electromagnet which has a coil in an operating circuit. A conductor has a first condition in which the circuit is closed for energizing the coil and a second condition in which the conductor is opened and the electromagnet is disabled. The conductor is movable manually from its first to its second condition; and means are provided for spontaneously restoring and holding the conductor in its second condition in response to armature operation.

BRIEF DESCRIPTION OF THE DRAWING

In the ensuing detailed description of the invention, reference is had to the accompanying drawing on which.

DETAILED DESCRIPTION OF THE INVENTION

Figure 1:
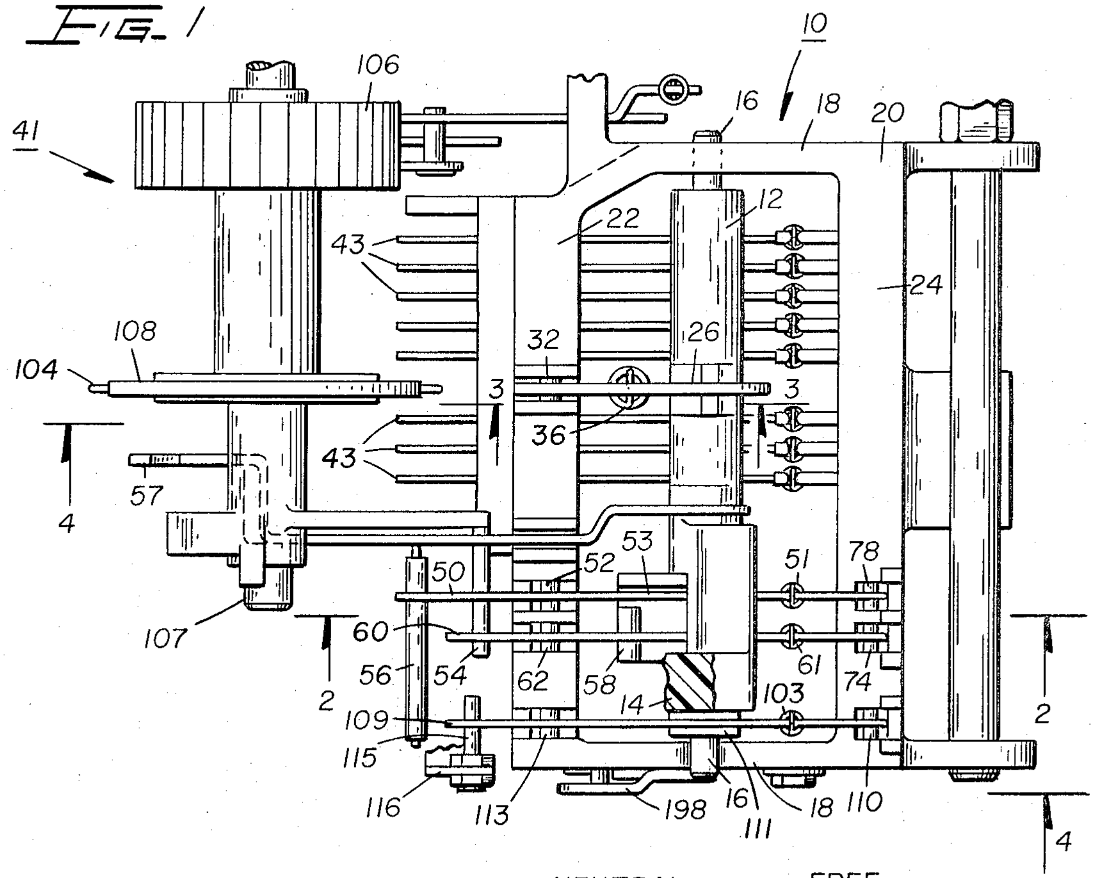
FIG. 1 is a plan view of a telegraph transmitter embodying the invention, parts of the transmitter having been omitted.

The tape transmitter, generally designated 10 in the drawing, herein is of the class disclosed in U.S. Pat. Re. No. 26,008, reissued April 26, 1966, for an invention of L. C. Anderson, Jr., et al. Transmitter 10 has a control mechanism of the type disclosed in U.S. Pat. No. 3,146,306, issued Aug. 25, 1964, on an invention of L. C. Anderson, Jr., et al. It also has a switching assemblage of the type disclosed in U.S. Pat. No. 3,264,418, issued Aug. 2, 1966 on an invention of A. A. Hagstrom; and an electromagnet structure of the type disclosed in U.S. Pat. No. 3,147,410, issued Sept. 1, 1964, on an invention of L. C. Anderson, Jr., et al. All of the foregoing patents have been assigned to the assignee of the present invention; and they are incorporated herein by reference. Attention is invited to said patents for a more complete disclosure of the transmitter in which the discontinuous mode feature described herein can be utilized.

Referring now further to the drawing, the transmitter 10 has a shaft 12 with opposed axially extending end portions 16, 16 (FIG. 1) which are journalled in opposed side walls 18, 18 of a contact block 20. A manually operable handle 14, which may be integrally formed on shaft 12, extends obliquely upwardly and comprises means for rocking the shaft about its axis. A pair of inner and outer end walls 22 and 24 of the block 20 are integrally formed with side walls 18, 18 to generate a generally rectangular configuration.

Figure 3:
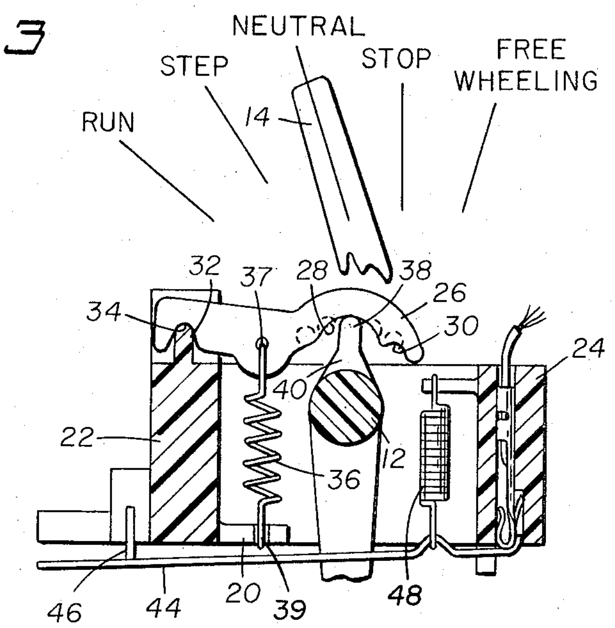
FIG. 3 is a sectional view according to the line 3—3 in FIG. 1, alternate conditions of a detent being shown in dotted lines.

A detent lever 26 (FIGS. 1 and 3) limits the rocking movement of shaft 12. Detent lever 26, though serving a related function to the detent lever of U.S. Pat. Re. Nos. 26,008 and 3,146,106 has two locking detent notches 28 and 30 (FIG. 3). A shoulder 32 (FIGS. 1 and 3) fashioned integrally with the block 20 extends upwardly from wall 22 and is engaged in a third notch 34 in detent lever 26. The shoulder 32 provides a fulcrum about which said lever is itself rockable against the action of a contractile spring 36, one end portion 37 of which is anchored on detent lever 26 and the opposite end portion 39 of which is anchored on the block 20. A rounded upper detent 38 of an integral upward projection 40 from the shaft 12 is proportioned for reciprocation in either of the notches 28 or 30 according to the angular disposition of the shaft.

The proportioning of the parts is such that when detent 38 is fully engaged in notch 30, the shaft 12 is held at a fixed angular aspect and will not move. When detent 38 is engaged in notch 30, the transmitter can be only in one mode, its FREE WHEELING mode in which a punched tape (not shown) can be manually drawn either forwardly or backwardly through the transmitter, as the tape advancing means 41 (FIGS. 4 and 6) is disabled. The condition of the components comprising the tape advancing means is amply described in the aforesaid U.S. Pat. No. 3,146,306 and accordingly is not repeated here.

When detent 38 is engaged in the notch 28, handle 14 and accordingly, shaft 12 may be rocked to any one of four functional aspects. These aspects are RUN, STEP, NEUTRAL, and STOP; and with the exception of "neutral" relate to a mode in which the transmitter is conditioned. In FIG. 3 the neutral aspects of the detent and handle 14 are shown in solid lines. The other aspects which the detent can assume are shown dotted. The handle 14 is normally urged toward neutral aspect by the contour of lever 26 under the bias of a spring 36 while detent 38 is engaged in notch 28, at any aspect therein.

A plurality of lower wire contact springs 43, only some of which are numbered in FIG. 1, are disposed below block 20. Each has an end portion 44 (FIG. 2) which is urged into engagement with a common contact bar 46 by a contractile spring 48. The end portions 44 are adapted for movement out of engagement with the common contact bar in selected combinations corresponding to each encoded character in a tape (not shown). These end portions respond to pressure on corresponding reading pins or hole sensors (not shown) coupled to said wire contact springs and effected by a superposed tape as set forth in said U.S. Pat. Re. No. 26,008. Thereby, contact is made and broken, as code combinations are being sensed in a perforated tape.

Figure 7:
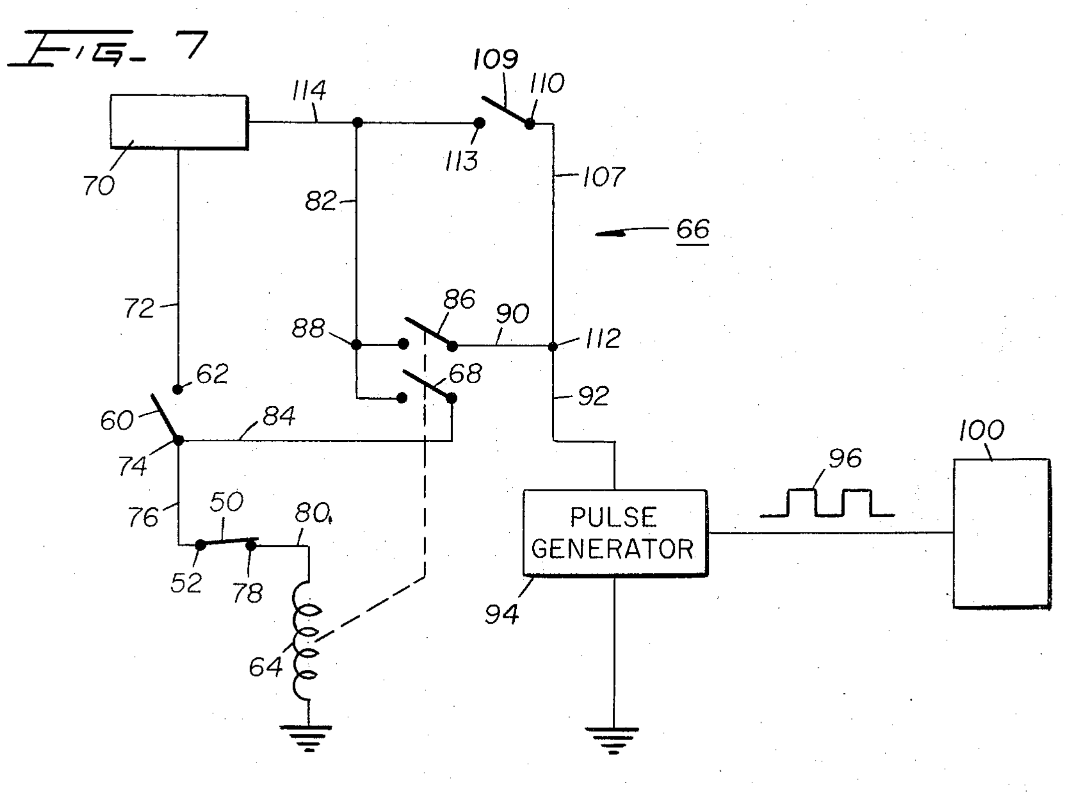
FIG. 7 is a wiring scheme for said transmitter.

To enable transmitter 10 to operate in continuous or running mode, a conductor, shown herein as an upper conductive wire contact spring 50 (FIGS. 2 and 7) must be closed against an electrical contact connector 52. Connector 52 comprises an element in the transmitter circuit generally designated 66 and is supported in wall 22 of block 20. Wire contact spring 50 is normally urged toward contact connector 52 by a contractile spring 51. A cam 53 (FIGS. 1 and 2), integrally fashioned with the shaft 12, is disposed beneath wire contact spring 50 for controlling the condition of circuit 66. The cam 53 is rockable between a first angular position when handle 14 is in its neutral aspect and the wire contact spring is engaged with the contact connector 52 (solid line position of FIG. 2) and a second angular position when the wire contact spring 50 is elevated away from contact connector 52 and the handle 14 is in its "stop" aspect, (dashed line cam position of FIG. 2), thereby disabling the transmitter. Cam 53 has a third angular position which obtains when handle 14 is in its free wheeling position aspect. Cam 53 is proportioned such that then, the wire contact spring 50 also is held disengaged from the contact connector 52.

Figure 2:
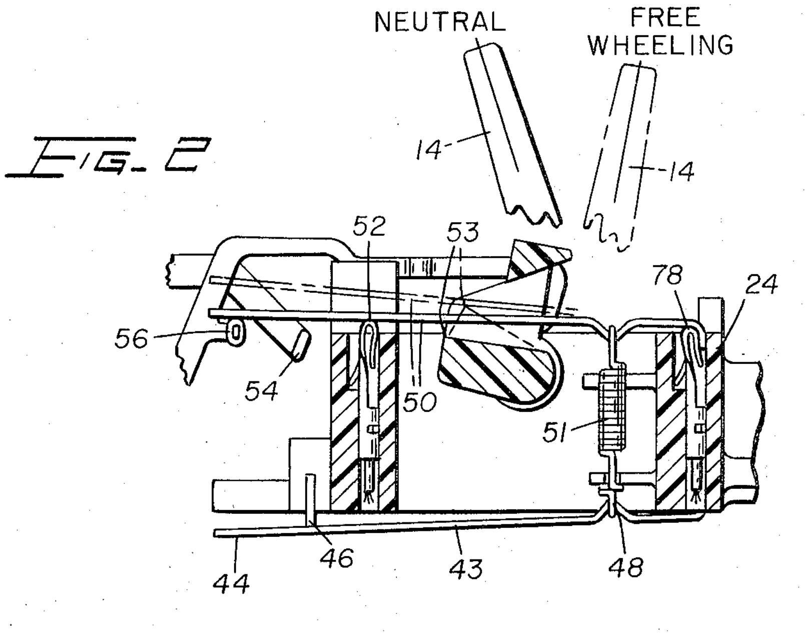
FIG. 2 is a sectional view according to the line 2—2 in FIG. 1.

Additionally, conductive engagement of contact connector 52 and the wire contact spring 50 can be broken by elevation of the latter member from its position of FIG. 2 when either a "tape out" condition or a "tight tape" condition is sensed in transmitter 10. An arm 54 is included in an assembly for breaking the transmitter circuit 66 in response to tight tape condition. Its normal or running condition (FIG. 2) permits engagement of spring 50 and connector 52, when transmitter 10 is in a running or continuous mode. The remainder of said assembly and its operation are described in detail in said U.S. Pat. Re. No. 26,008 and therefore further description is omitted herein except to note that when a tight tape condition is sensed in the transmitter 10, arm 54 becomes elevated responsively to disengage spring 50 from connector 52.

Means for breaking circuit 66 in response to a tape out condition includes an arm 56. Its normal or running condition (FIG. 2) permits engagement of spring 50 and connector 52 when the transmitter 10 is in a continuous mode. Arm 56 is an extension of a tape-out sensing pin 57 and is adapted to operate in a manner which is particularly described in said U.S. Pat. No. 3,146,306. Therefore, further description is omitted herein, except to note that when a tape-out condition is sensed in the transmitter 10, arm 56 becomes elevated responsively to disengage spring 50 from connector 52.

A second cam 58 (FIGS. 1 and 4–6) fashioned integrally with shaft 12, normally holds a conductor, herein being an upper conductive wire contact spring 60 (FIGS. 1 and 7) out of engagement with an electrical contact connector 62, when handle 14 is in its neutral aspect. The wire contact spring 60 is parallel to, though shorter than, wire contact spring 50; and the contact connector 62 is mounted in wall 22 of block 20 in vertical alignment with wire contact spring 60. A spring 61 (FIG. 1) similar to spring 51 biases wire contact spring 60 from normal position toward contact connector 62.

To initiate operation of transmitter 10 in a continuous or running mode in which a tape is spontaneously advanced and intermittently stopped for "reading" a succession of encoded characters punched into a tape, the handle 14 is rocked manually from any position to its run aspect. Cam 58 is proportioned such that, then, it will enable engagement of contact connector 62 and contact wire spring 60 under bias of spring 61 to close circuit 66. The handle need be held in its run aspect to enable an inductance 64 (FIG. 7) in circuit 66 to be energized from a low voltage d.c. source 70 for a period sufficient to close a normally open relay switch 68 controlled by the inductance. This results from flow of current from source 70 through a lead 72, then through connector 62, wire 60, and a fixed connector 74 (FIGS. 1 and 7), a conductive strap 76, connector 52, then through conductive wire spring 50, its fixed terminal 78, and finally through lead 80 to the inductance 64. Thereafter, the handle may be released; whereupon, under bias of spring 36, the handle will return to its neutral aspect.

This last movement of the handle 14 results in elevation of the wire contact spring 60 away from the contact connector 62 in response to cam 53. However, such return will not affect the continuous or running mode which has been imposed on transmitter 10, inasmuch as inductance 64 will continue to be energized as current flows from source 70, through a conductor 82, through now closed switch 68, then through a conductor 84 to contact connector 74, then through strap 76, connector 52, and then through wire contact spring 50, fixed terminal 78 and lead 80 to the inductance. The arrangement is such that once wire contact spring 50 and the contact connector 52 are disengaged, coil 64 will become deenergized, thereby causing the switch 68 to its normal or open condition and stops flow of the current from source 70, pending its reinitiation by moving the handle 14 to its run condition when wire contact spring 50 and contact connector 52 are in engagement.

While the switch 68 is closed, transmitter 10 will operate in its continuous mode because another normally open relay switch 86 is controlled by inductance 64 and moves to a closed condition upon energization of said inductance. One of the terminals 88 of switch 86 is connected to an electrical conductor 82. Its other terminal is connected to a lead 90 which in turn is connected, through a conductor 92, to a pulse generator 94. The pulsed signal 96 which generator 94 is adapted to emit in response to source 70, intermittedly energizes the coil 98 (FIG. 4) of an electromagnet 100, and thereby intermittently rocks armature assembly 102 of said electromagnet. Ensuingly, a punched tape (not shown) will be moved continuously in successive increments by sprocket pins 104 (which form a component of advancing means 41), and intermittently stopping between increments and sensed by reading pins (not shown). The details of the tape advancing and hole sensing means are completely described in one or more of the aforesaid patents, and detailed description thereof is omitted. Noted however is the following: Upon energization of coil 98, armature plate 170 of armature assembly 102 will rock clockwise (from the position of FIG. 4). Upon de-energization, armature plate 170 becomes restored to its position of FIG. 4 and a dog or pawl 105 (FIG. 4) included in advancing means 41 moves downwardly incrementally rotating a ratchet wheel 106. A shaft 107 on which the ratchet 106 is carried correspondingly will be caused to rotate incrementally and cause a sprocket wheel 108 to incrementally move a tape (not shown) a distance of one encoded character. Moreover, in proper timed relationship, in response to actuation of said armature assembly 102, a plurality of reading pins or hole sensors (not shown) will be moved upwardly with resultant effect to close corresponding ones of the lower wire contact springs 43 against contact bar 46 in a manner heretofore known.

In accordance with the present invention transmitter 10 has a discontinuous or single step mode. That is to say, a tape can be moved or stepped by advancing means 41 a single increment, being the distance between one encoded character and the next. Then motion of the tape will stop. An intentional manual effort is thereafter required to move the tape again. The discontinuous mode differs from the continuous mode in that in the latter the tape is advanced in successive increments, spontaneously. The discontinuous or single step mode heretofore has been unknown in the prior art.

Particularly, in accordance with the invention, an auxiliary circuit is provided for energizing the electromagnet 100 to advance the tape one step, including a conductor, here being an upper wire contact spring 109 (FIGS. 1 and 4–7), disposed parallel to the wire contact springs 50 and 60. One end of spring 109 is permanently connected to pulse generator 94 through a terminal or contact connector 110 which together with terminals 74 and 78 are secured in wall 24 of block 20 (FIG. 1). A conductive lead 107 (FIG. 7) from terminal 110 in turn is connected to a junction 112 at which lead 90 connects to conductor 92.

Yet another cam 111 (FIGS. 1 and 4) is fashioned integrally with the shaft 12. This cam normally holds upper wire contact spring 109 superposed and out of engagement from a terminal or contact connector 113, the latter being mounted in inner wall 22 of block 20. A conductive lead 114 which is connected to connector 113 passes current from source 70 to pulse generator 94 each time wire contact spring 109 is lowered into engagement with the contact connector 113.

Cam 111 is fashioned such that when handle 14 is rocked from its neutral aspect (FIG. 4) to its step aspect (FIG. 5), said cam moves out of its supportive position of contact spring 109. The latter is biased toward engagement with contact connector 113 by a spring 103 (FIG. 1) similar to spring 51. However, at the beginning of a stepping cycle (which is initiated by movement of handle 14 to its step aspect), a stripper 115 in the form of a post also is disposed for engagement with wire contact spring 109 from below and temporarily prevents its descent following movement of the cam 111. Stripper 115 has a horizontal aspect; and it is secured on the upper end of an arm 116 which has a generally vertical aspect. Means including a nut 118 operably threaded on an outer end portion of said stripper enables its vertical adjustment on arm 116.

Figure 4:
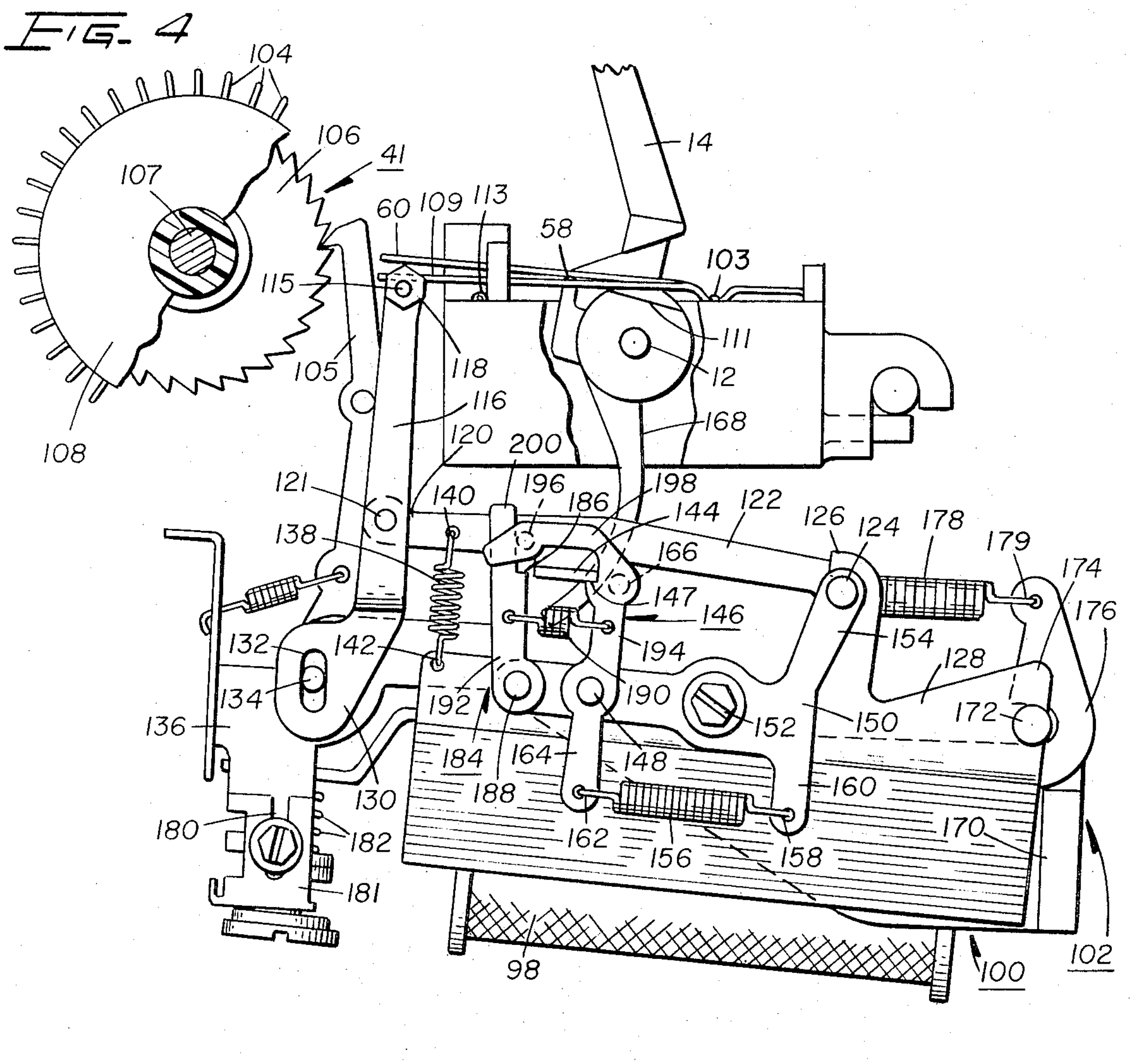
FIGS. 4, 5, and 6 are similar views according to the line 4—4 of FIG. 1 and showing in side elevation and variously conditioned, the mechanism for operating the telegraph transmitter in a discontinuous mode, parts of the transmitter having been omitted.

One end portion 120 of a transversely extending lever 122 is pivotally connected at 121 to a medial part of arm 116. The opposite end portion of said lever is rockably mounted on a shaft 124. Said shaft has a pair of opposed ends fixedly mounted in a pair of upwardly extending arms 126 (only one of which is shown in FIGS. 4, 5, and 6) of a fixed bracket 128 on which the electromagnet 100 is mounted.

The lower end portion 130 of arm 116 has a generally vertically extending slot 132 through which a post 134 extends from an end portion 136 of armature assembly 102. The diameter of the post is less than the vertical length of the slot, the parts being proportioned such that arm 116 is adapted to move between a first or upper position (FIG. 4) in which wire contact spring 109 is held out of engagement with contact connector 113, and a second or lower position (FIG. 5) in which wire contact spring 109 has been liberated from stripper 115 and is engaged with contact connector 113.

A contractile spring 138 (FIGS. 4–6) has an upper end extension 140 anchored on end portion of lever 122 and a lower end extension 142 anchored on a portion of bracket 128. Spring 138 tends to resist clockwise movement of lever 122 about shaft 124 from the position of FIG. 5 to its position of FIG. 4 or 6.

Figure 5:
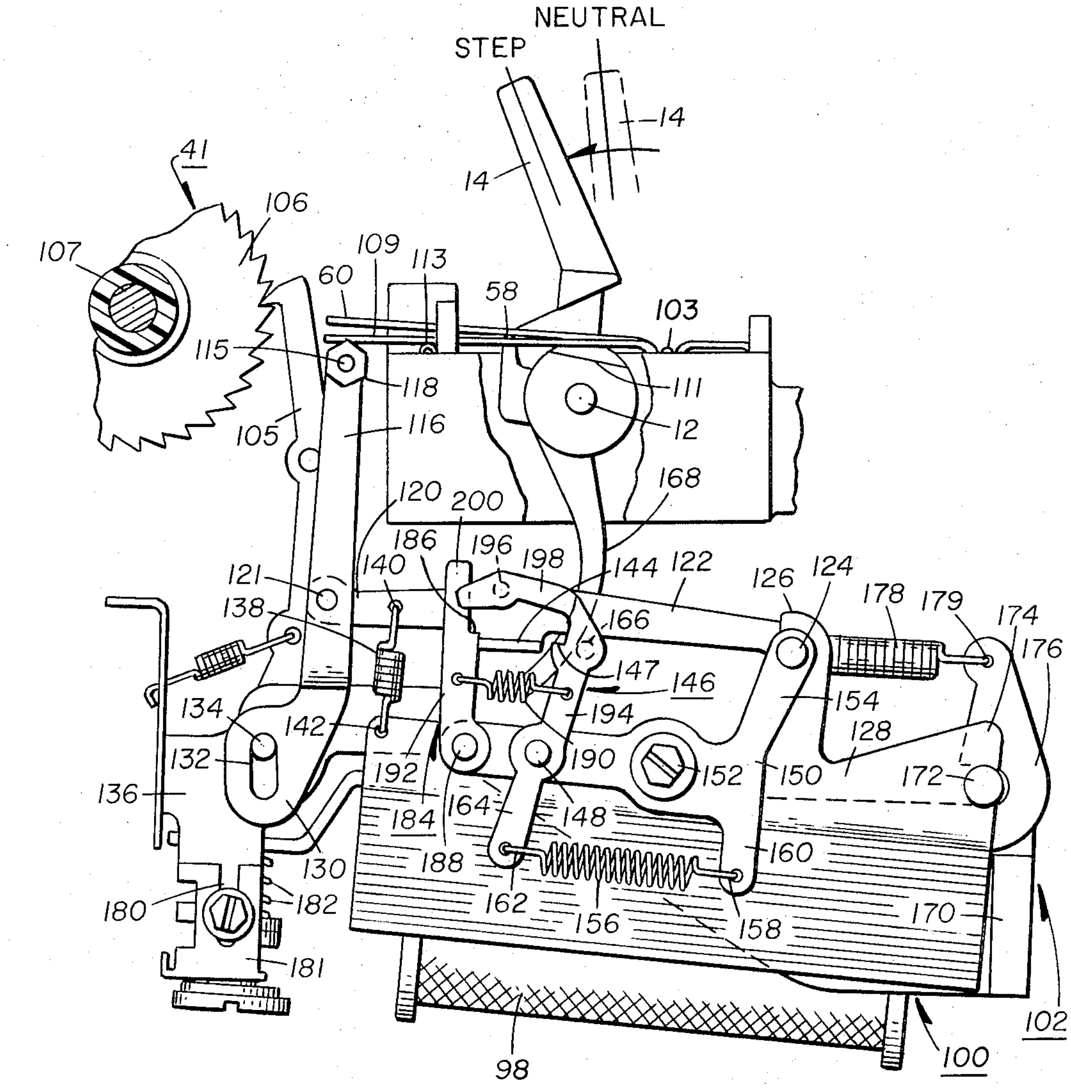
Figure 6:
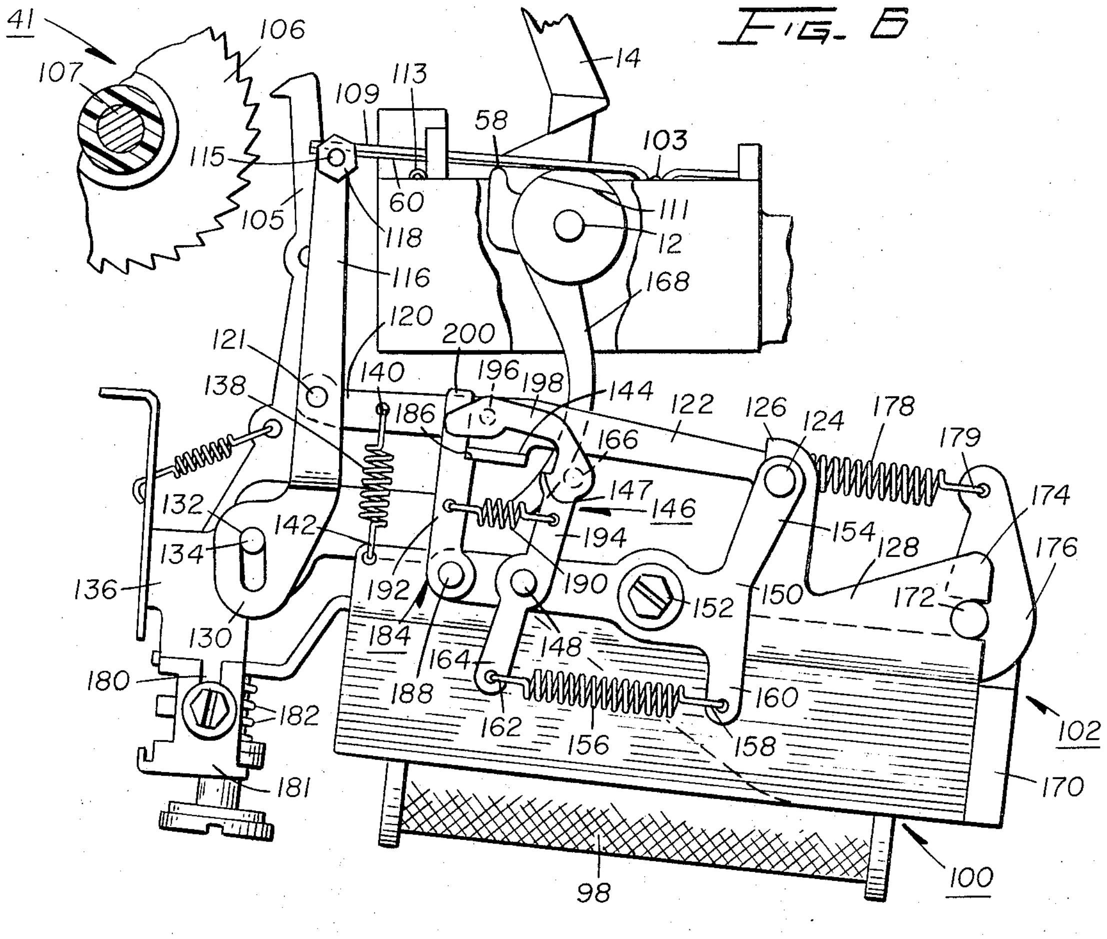

A catch 144 depending from lever 122 can be hung up on the latching surface 147 of a primary latch 146 to prevent movement of arm 116 from its first position (FIG. 4) to its second position (FIG. 5). A fixed pivot pin 148 extends through a medial portion of the latch 146 and enables said latch to be rocked between a first position (FIG. 4) in which lever 122 is constrained by latch 146 and a second position (FIGS. 5 and 6) in which catch 144 is disengaged from surface 147 whereby lever 122 is liberated enabling the arm 116 to move from its first position (FIG. 4) to its second position (FIG. 5) as spring 138 draws lever 122 downwardly.

Pivot pin 148 projects outwardly from a bracket 150. The latter is rigidly secured to the bracket 128 by a screw 152, the securance to bracket 128 being augmented by an arm 154 of bracket 150 which is disposed about an end portion of shaft 124. A contractile spring 156 has an end extension 158 anchored on the lower projection 160 of bracket 150. An opposed extension 162 of spring 156 is anchored on the depending leg 164 of latch 146. Spring 156 is proportioned and arranged for urging latch 146 to its first position (FIG. 4) from its second position (FIG. 5).

A follower 166 carried from the upper portion of latch 146 is held in engagement by spring 156 with a depending cam 168 from shaft 12. The parts are arranged and proportioned such that as the handle 14 moves from its neutral aspect (FIG. 4) to its step aspect (FIG. 5), latch 146 will be moved from its first position to its second position against the bias of spring 156 and in consequence of the counterclockwise movement of cam 168 when viewed from FIG. 4. Upon ensuing disengagement of the latching surface 147 and the catch 144, lever 122 will be rocked counterclockwise about shaft 124 as the spring 138 releases its tension. In consequence arm 116 will be moved downwardly from its first position (FIG. 4) to its second position (FIG. 5) with the resultant engagement of wire contact spring 109 and contact connector 113.

Armature assembly 102 is of the type particularly described in said U.S. Pat. No. 3,147,410. Its magnetic plate 170 is rockable about a shaft 172 between its normal position (FIG. 4) when said coil 98 is not energized and its attracted position (FIG. 6) when coil 98 is energized. Shaft 172 is secured in opposed extensions 174 (only one of which is shown in FIGS. 4, 5, and 6) of bracket 128.

An elongated lever-like armature extension 176 is included in armature assembly 102. Said armature extension has one end portion rockably disposed about shaft 172 and rocks with plate 170 to which said extension is secured. The opposite end portion 136 of armature extension 176, heretofore described in connection with post 134, is mechanically connected to a reciprocater pawl 105 for controlling ratchet wheel. Reciprocation of end portion 136 is guided by a slot 180 (FIGS. 4–6) in a fixed member 181, upward movement of end portion 136 being against the restoring action of a compression spring 182.

Slot 132 is proportioned such that it will accommodate up and down reciprocation of post 134 when the transmitter 10 is in its continuous mode, as armature plate 170 rocks back and forth in response to the pulsed signal 96. A contractile spring 178 which has an end portion 179 anchored on armature extension 176 and an opposite end portion anchored on shaft 124 is proportioned and arranged for restoring the plate 170 to its normal position (FIG. 4) from its attracted position (FIG. 6).

Upon movement of arm 116 to its second position (FIG. 5) from its first position (FIG. 4), in response to movement of handle 14 to its run aspect, first, post 134 will become engaged in the top of slot 132. Thereafter, when magnetic plate 170 is rocked clockwise as the electromagnet 100 is energized because contact connector 113 and spring 109 have become engaged, armature extension 176 will rock clockwise from its position of FIG. 5 to its position of FIG. 6 and will move post 134 upwardly. Accordingly, the coaction of said post and said arm 116 will move arm 116 from its second position (FIG. 5) to its first position (FIG. 6). In consequence of such movement, lever 122 will be rocked clockwise and upwardly; catch 144 which theretofore has been lowered will be raised by arm 116 to its position of FIG. 6; and contact connector 113 and spring 109 will disengage.

A secondary latch 184 with a latching surface 186 is pivotally connected at its lower end to bracket 150 by a pin 188, the latter being secured to bracket 150. Latch 184 is rockable between a first or catch supportive aspect (FIG. 6) in which latching surface 186 engages the catch 144 from below when arm 116 is in its first position and the primary latch 146 is in its second position (FIG. 6) and a second aspect (FIG. 4) in which primary latch 146 is in its first position (FIG. 4). Synchronization of movement of the primary and secondary latches is effected through means including a contractile spring 190 having one extension anchored to a medial part 192 of the secondary latch and an opposite extension connected to a medial part 194 of the primary latch. In consequence, as latch 146 rocks clockwise from its position of FIG. 4 to its position of FIG. 5, latch 184 will be tensioned for rocking clockwise.

An abutment 196 is carried in an upper projection 198 of latch 146. It limits movement of latch 184, under action of spring 190 toward latch 146, by engaging the upper latch portion 200 as latch 146 is restored to its first condition (FIG. 4) from its second position (FIG. 6) in response to movement of handle 14 from its step position to neutral.

OPERATION OF THE INVENTION

To operate the transmitter 10 in a discontinuous or stepwise mode, it is required that relay switch 68 be opened. Otherwise, attempts to operate in a discontinuous mode are overridden. Accordingly, if the transmitter 10 is in a continuous mode, handle 14 must be moved to its stop position (FIG. 3), before the discontinuous mode can be attained. This will cause arm 54 to elevate to disengage the upper wire spring 50 and contact connector 52. Coil 64 will thereby de-energize to open switch 68. Thereafter, upon release of handle 14, it will be restored to its neutral or home position, though switch 68 will remain open until intentionally closed. If the handle is being held in its free-wheeling position, it is required that it be moved to its neutral position before operating the transmitter in its stepwise or discontinuous mode.

From its neutral position, provided that the transmitter 10 is not in its continuous mode, movement of the handle 14 to its step aspect will produce operation of the transmitter 10 in a discontinuous mode. Responsively, cam 168 will be rocked counterclockwise from its position of FIG. 4 to its position of FIG. 5. Thereby, latch 146 will be rocked clockwise as said cam coacts with follower 166. Resultantly, latching surface 147 will be withdrawn from catch 144; and lever 122 will be drawn downwardly to the position of FIG. 5 under the action of spring 138.

As the handle 14 is moved from its neutral aspect (FIG. 4) toward step aspect (solid line of FIG. 5), cam 111 will rotate counterclockwise out of its supporting position for spring contact wire 109. The latter will first drop onto stripper 115. Then, as arm 116 is drawn from its first position (FIG. 4) to its second position (FIG. 5) by lever 122, spring contact wire 109 will drop into engagement with contact connector 113.

Thereupon, switches 68 and 86 will be drawn closed and the voltage source 70 will energize the pulse generator 94 causing energization of the electromagnet 100. Resultantly, the armature plate 170 will move from its position of FIG. 5 which depicts the condition (immediately prior to energization of the electromagnet) to its position of FIG. 6. Upon such movement, end portion 136 will be moved upwardly from its position of FIG. 5 to its position of FIG. 6 and cause arm 116 to be driven upwardly through post 134. Correspondingly, spring contact wire 109 and the contact conductor 113 will be separated as arm 116 raises. This, of course, further prevents communication between the pulse generator 94 and the source 70, as the inductance 64 holding switches 68 and 84 in closed condition de-energizes.

As arm 116 moves upwardly, lever 122 is rocked clockwise moving from its position of FIG. 5 to its position of FIG. 6. In so doing, the catch 144 is elevated a distance sufficient to clear latching surface 186. While catch 144 is in the position of FIG. 5, it functions as a spacer and limits clockwise movement of latch 184 under tension of spring 190. However, upon clearance by catch 144 of latching surface 186, latch 184 is drawn toward latch 146, as spring 190 relaxes, to bring latching surface 186 beneath catch 144.

Release of handle 14 from manual control after it has been moved to its step aspect results in its spontaneous return of cam 111 to its supportive position of spring contact wire 109, as handle 14 is restored to neutral position in response to spring 36. Simultaneously, as spring 156 releases tension, latch 146 moves from its position of FIG. 6 to its position of FIG. 4 and the latching surface 147 once again returns to supportive and restraining association with catch 144. Simultaneously, abutment 196 will force the secondary latch 184 from its supportive position (FIG. 6) to its initial non-supportive position (FIG. 4) against the action of spring 190.

Should an operator fail to release handle 14 following its movement to its step aspect, an additional cycle of transmitter 10 in a discontinuous mode is prevented as the catch 144 is hung on the latching surface 186. In consequence, the spring contact wire 109 cannot be lowered to engagement with the contact connector 113. This is to say, that unitl after latch 146 has been restored to its first position (FIG. 4), a single step of the transmitter cannot be repeated, the secondary latch 184 comprising a safeguard against that eventually and unintentional operation.

Though the armature assembly 102 rocks continuously while the transmitter 10 is in a continuous mode, arm 116 is held in its first position (FIG. 4) in consequence of the latching engagement of surface 147 and catch 144, the rocking of said armature assembly being accommodated by slot 132.

As many modifications in the described construction could be conceived, and as many widely different embodiments could be made without departing from the spirit and scope of the claims, it is intended that all matter contained in the accompanying specification shall be considered as illustrative only and not in a limiting sense.

We claim:

1. In combination with a data-sensing transmitter of the type having a continuous mode of operation, during which a coded tape is advanced past a sensing station for producing a stream of outputs in response to repeated movement of the armature of an electromagnet, a manually operable system for operating the transmitter in a single-step discontinuous mode, comprising:
 - an auxiliary circuit for energizing the electromagnet to advance the tape;
 - a conductor in said auxiliary circuit having a first position in which said electromagnet is energized through said circuit and a second position in which said electromagnet cannot be energized through said circuit;
 - manually operable means for moving said conductor from its second toward its first position to operate said electromagnet and its armature; and
 - means for restoring and holding said conductor in said second position in response to armature operation, so that said auxiliary circuit cannot be re-actuated without a second actuation of said manually operable means.

2. A combination according to claim 1, wherein said restoring and holding means includes:
 - a mechanical catch operably connected to said armature and biased toward a first position for moving said conductor to its first position; and
 - means for returning said catch to a second position upon energization of said electromagnet and moving said conductor to its second position from its first position.

3. A combination according to claim 2 wherein said manually operable means comprises:
 - a handle movable from a first aspect to a second aspect for releasing said catch to its first position and from said second aspect to said first aspect for restoring said catch to its second position; and
 - means for urging and normally holding said handle in the first aspect.

4. A combination to claim 3 wherein said restoring and holding means additionally comprises means for preventing movement of said catch toward said first position from its second position until restoration of said handle to said first aspect following handle movement to said second aspect.

5. A combination according to claim 4 wherein said preventing means comprises:
 - a latch having a first position in restraining engagement with said catch in its second position for preventing movement of said conductor to its first position, said latch having a second position in which said catch is in its first position.

6. A combination according to claim 5 further having a cam connected to said handle for moving said latch from its first to its second position.

7. In a tape sensing transmitter having a rockably mounted mode selecting handle, contacts for controlling the transmitter output upon energization, a mechanism for feeding a tape through the transmitter, and a circuit including an electromagnet for operating said mechanism, characterized by said handle having (a) a run aspect in which the mechanism is conditioned for repeated continuous operation to move a tape spontaneously for successive incremental distances; (b) a stop aspect in which operation of the mechanism is terminated following continuous operation, (c) a step aspect in which the mechanism is conditioned for advancing the tape discontinuously a single step, and a neutral aspect, said transmitter further having:

means for spontaneously restoring said handle to said neutral aspect following release from manual restraint after movement to any of the other aspects;

means for initiating and continuing operation of said mechanism in response to movement of said handle to the run aspect following return of said handle to said stop position; and means for terminating operation of said mechanism in response to movement of said handle to said stop aspect.

8. A combination according to claim 7 further having:

means responsive to said handle upon movement to said step aspect for operating said mechanism to discontinuously move said tape a single incremental distance; and means for preventing operation of said mechanism discontinuously following one discontinuous operation before return of said handle from its step aspect to its neutral aspect.

9. A combination according to claim 7 wherein said means for initiating and maintaining operation comprises:

a first switch in said circuit having a circuit closed condition when said handle is in its run aspect and a circuit open condition when said handle is in its neutral aspect;

a relay in said circuit and being energized through said first switch when in closed condition; and a second switch having a circuit closed condition in response to said relay when energized, and a circuit open condition when said relay is de-energized, said second switch connected in said circuit for energizing said relay when closed and said handle is in said neutral aspect.

10. A combination according to claim 9 wherein said terminating means comprises an element for opening said second switch upon movement of said handle to said stop aspect.

11. In a telegraph transmitter having a continuous mode during which a tape is advanced spontaneously successive incremental lengths in response to reciprocation of the armature of an electromagnet, the improvement comprising:

manually operable means for energizing the electromagnet a single time so that the transmitter is operated in a discontinuous mode for advancing a tape a single and discontinuous step; and means, responsive to armature operation as a result of the manually operable means, for spontaneously terminating transmitter operation after the single step and for preventing unintentional advance of the tape thereafter without a second operation of the manually operable means.

* * * * *